United States Patent Office 3,305,453
Patented Feb. 21, 1967

3,305,453
CONVERSION OF PENICILLIN V TO 6-AMINOPEN-ICILLANIC ACID BY THE USE OF SPORES
Kartar Singh, Beaconsfield, Quebec, Surendra Nath Sehgal, St. Laurent, Quebec, and Claude Vezina, Oka, Quebec, Canada, assignors, by mesne assignments, to Wisconsin Alumni Research Foundation, Madison, Wis., a corporation of Wisconsin
No Drawing. Filed Oct. 8, 1963, Ser. No. 314,644
4 Claims. (Cl. 195—36)

The present invention relates to the production of 6-aminopenicillanic acid (6–APA), and more specifically to the conversion of penicillin V (phenoxymethyl penicillin) to 6–APA by the use of spores as described below.

It has been known for some time that 6–APA (6-aminopenicillanic acid) is a valuable intermediate or building stone for preparing various penicillins. For example, the 6-amino group readily reacts with acyl chlorides as, for example, phenyl-acetyl chloride, to yield benzylpenicillin or penicillin G. In view of this, the art has been searching for improved processes of preparing 6–APA as well as the use of 6–APA in the preparation of improved penicillins.

The process of the present invention uses spores of fusaria and specifically spores of *Fusarium conglutinans* or spores of *Fusarium moniliforme*. The spores can be readily produced by culturing the organisms on moist pot barley as described in our copending application Serial No. 369,396 filed May 18, 1964. The spores can also be produced by conventional means including surface culture by growing of the organisms on agar slants or by culturing of the organisms under submerged aerobic conditions. The spores which can be harvested in aqueous suspension form and recovered by centrifugation are preferably washed three or four times with distilled water and then suspended in phosphate buffer, pH 7–8, to give suspensions containing about $2 \times 10^8$ to $1 \times 10^9$ spores per ml.

The spores used in the process of the present invention do not grow and produce mycelium as the conversion medium does not contain available nitrogen, the presence of which is essential for the spores to germinate and grow. See Knight, U.S. Patent No. 3,031,379. In view of this the recovery of 6–APA in high yield from a relatively simple medium may be readily carried out as described below. Conversion of penicillin V to 6–APA may also be carried out with or without glucose. Moreover, spores used in one conversion are recovered by centrifugation and may be re-used for at least three subsequent conversions.

Optimum incubation periods may be readily ascertained by preliminary tests. Complete conversion of penicillin V to 6–APA in the incubation period is not necessary as penicillin V may be recovered for use in other conversions.

Spores of the above Fusaria are incubated, preferably under submerged aerobic conditions, with penicillin V at 24 to 28° C., in flasks on a rotary shaker, or in 5-liter fermentors equipped with the impeller and sparger for aeration. Glucose may be added or may be omitted from the incubation mixture. Aliquots are sampled at suitable intervals, centrifuged, and the supernatant is assayed for 6-aminopenicillanic acid (6–APA) by the following modification of the procedure described by F. R. Batchelor, E. B. Chain and G. N. Rolinson published in Proceedings of the Royal Society, Series B, vol. 154, page 478.

A two-ml. sample is adjusted to pH 2 and extracted twice with 4-ml. portions of butyl acetate to remove unreacted penicillin V. The aqueous extract, containing 6–APA, is adjusted to pH 7–9 with sodium bicarbonate. Suitable aliquots of this neutralized mixture are spotted on strips of buffered paper. The strips are then sprayed with a 2% solution of phenyl acetyl chloride to convert 6–APA to penicillin G. The strips are then placed on agar plates previously seeded with *Micrococcus pyogenes* var. *aureus*. After suitable incubation at 37° C., the plates are examined and the zones of inhibition are read. The amount of 6–APA formed by the action of the spores can be calculated by interpolation of the results on a standard curve. By this assay method, yields of up to 70–80% of 6–APA are demonstrated for the above procedure.

For the preparation and isolation of 6-aminopenicillanic acid the contents of a number of flasks of fermentors, incubated as above, are combined, centrifuged and concentrated to about one-tenth of the original volume in vacuo at 25 to 30° C. or by freeze drying. Unconverted penicillin V is removed by adjusting the pH to 3.0 and extracting with butyl acetate. The extracted aqueous solution is adjusted to pH 7.5 with sodium hydroxide, and three volumes of acetone are added. A semi-solid phase is removed by centrifugation, and the centrifugate is concentrated in vacuo to a volume of about one-twentieth of the original supernatant. 6-aminopenicillanic acid present in that concentrate is purified by one or more of the adsorption and elution procedures described by F. R. Batchelor, E. B. Chain, T. L. Hardy, K. R. L. Mansford and G. N. Rolinson published in Proceedings of the Royal Society, Series B, vol. 154, page 498.

Adsorption on cellulose, an aliphatic polyamine resin (Deacidite FF), a polystyrene sulfonic acid resin (Amberlite IR–120), or a polystyrene trimethyl benzyl ammonium chloride resin (Dowex 1), followed by elution with suitable solvents, gives satisfactory results. Eluate fractions containing 6-aminopenicillanic acid are combined, adjusted to pH 7.0 and concentrated in vacuo. 6-aminopenicillanic acid is crystallized from this concentrate by adding hydrochloric acid to pH 4.3.

The following examples will serve to illustrate the invention.

EXAMPLE I

One hundred (100) ml. of a buffered spore suspension containing about $2 \times 10^8$ spores per ml. of *F. conglutinans* is added to a 500 ml. Erlenmeyer flask. About 200 mg. of glucose and 200 mg. of penicillin V are next added to the spore suspension and the resulting mixture is then incubated under submerged aerobic conditions on a rotary shaker at 28° C. for about 48 hours. The above procedure may also be carried out without adding 200 mg. of glucose.

EXAMPLE II

Fifty (50) ml. of a buffered spore suspension containing about $1 \times 10^9$ spores per ml. of *F. moniliforme* is added to a 250 ml. Erlenmeyer flask. About 100 mg. of glucose and 100 mg. of penicillin V are next added to the spore suspension and the resulting mixture is then incubated under submerged aerobic conditions on a shaker at about 28° C. for about 48 hours. The above procedure may also be carried out without adding 100 mg. of glucose.

EXAMPLE III

The contents of a number of flasks incubated as described in Example I or II are combined, centrifuged and concentrated to about one-tenth of the original volume in vacuo at 25–30° C., or by freeze drying. The pH of the concentrate is adjusted to 3.0 by adding 50% phosphoric acid, and the resulting mixture is clarified by centrifugation. The clarified solution is extracted twice with equal volumes of n-butyl acetate, and the pH of the extracted aqueous phase is adjusted to pH 7.5 by addition of sodium hydroxide. Three volumes of acetone are added, resulting in separation of a semi-solid phase containing substantially only inactive material, which is removed by a centrifugation. The clear centrifugate is concentrated in vacuo to approximately one-twentieth of the volume of the original supernatant. It may be purified by one of the following methods.

*Method A.*—Using columns of an aliphatic polyamine resin (Deacidite FF), previously treated with 4% sodium hydroxide and then conditioned in the acetate form by percolating with 6% acetic acid. The above concentrate is adsorbed on the column, and 6-aminopenicillanic acid is eluted with 1 N acetic acid. The eluates may be further purified by adsorbing them on a column of cellulose powder previously wetted with water and eluting with a mixture of acetone:isopropanol:water 2:2:1. These eluates contain 6-aminopenicillanic acid in a state of purity sufficiently high for subsequent crystallization.

*Method B.*—A polystyrene sulfonic acid resin (Amberlite IR–120) is conditioned in the free acid form with 10% hydrochloric acid, and washed with water before use. The above concentrate is adsorbed on that resin, the resin is washed, slurried with a little water, and the suspension is brought to neutrality by addition of ammonia, after which it is filtered. 6-aminopenicillanic acid is present in the filtrate in a state of purity sufficiently high for subsequent crystallization.

*Method C.*—A polystyrene trimethyl benzyl ammonium chloride resin (Dowex I), is first treated with 4% sodium hydroxide and then with 1 N hydrochloric acid to obtain it in the chloride form, and washed with water. The above concentrate is adsorbed on columns of the resin prepared as above, eluted with 0.1 N hydrochloric acid, the column washed with water, and the combined percolate and washings adjusted to pH 7.0 with 4 N ammonia. The resulting solution contains 6-aminopenicillanic acid in a state of purity sufficiently high for subsequent crystallization.

Crystallization of 6-aminopenicillanic acid is effected by adjusting sufficiently pure eluates as obtained by one of the methods shown above to pH 4.3 by addition of 10% hydrochloric acid. The crystalline precipitate is filtered, washed with a little cold water and dried.

It is claimed:

1. The process of converting penicillin V to 6-aminopenicillanic acid which comprises carrying out the conversion under submerged aerobic conditions in the absence of available nitrogen with spores of *F. conglutinans* in an aqueous medium in which the spores cannot germinate.

2. The process of converting penicillin V to 6-aminopenicillanic acid which comprises carrying out the conversion under submerged aerobic conditions in the absence of available nitrogen with spores of *F. moniliforme* in an aqueous medium in which the spores cannot germinate.

3. The process of producing 6-aminopenicillanic acid which comprises incubating a mixture consisting essentially of penicillin V, glucose and spores of *F. conglutinans* at about 28° C. under submerged aerobic conditions in the absence of available nitrogen in an aqueous medium in which the spores cannot germinate.

4. The process of producing 6-aminopenicillanic acid which comprises incubating a mixture consisting essentially of penicillin V, glucose and spores of *F. moniliforme* at about 28° C. under submerged aerobic conditions in the absence of available nitrogen in an aqueous medium in which the spores cannot germinate.

References Cited by the Examiner

UNITED STATES PATENTS

| | | | |
|---|---|---|---|
| 3,031,379 | 4/1962 | Knight | 195—51 |
| 3,161,573 | 12/1964 | Godtfredsen | 195—36 |

A. LOUIS MONACELL, *Primary Examiner.*

D. M. STEPHENS, *Assistant Examiner.*